UNITED STATES PATENT OFFICE.

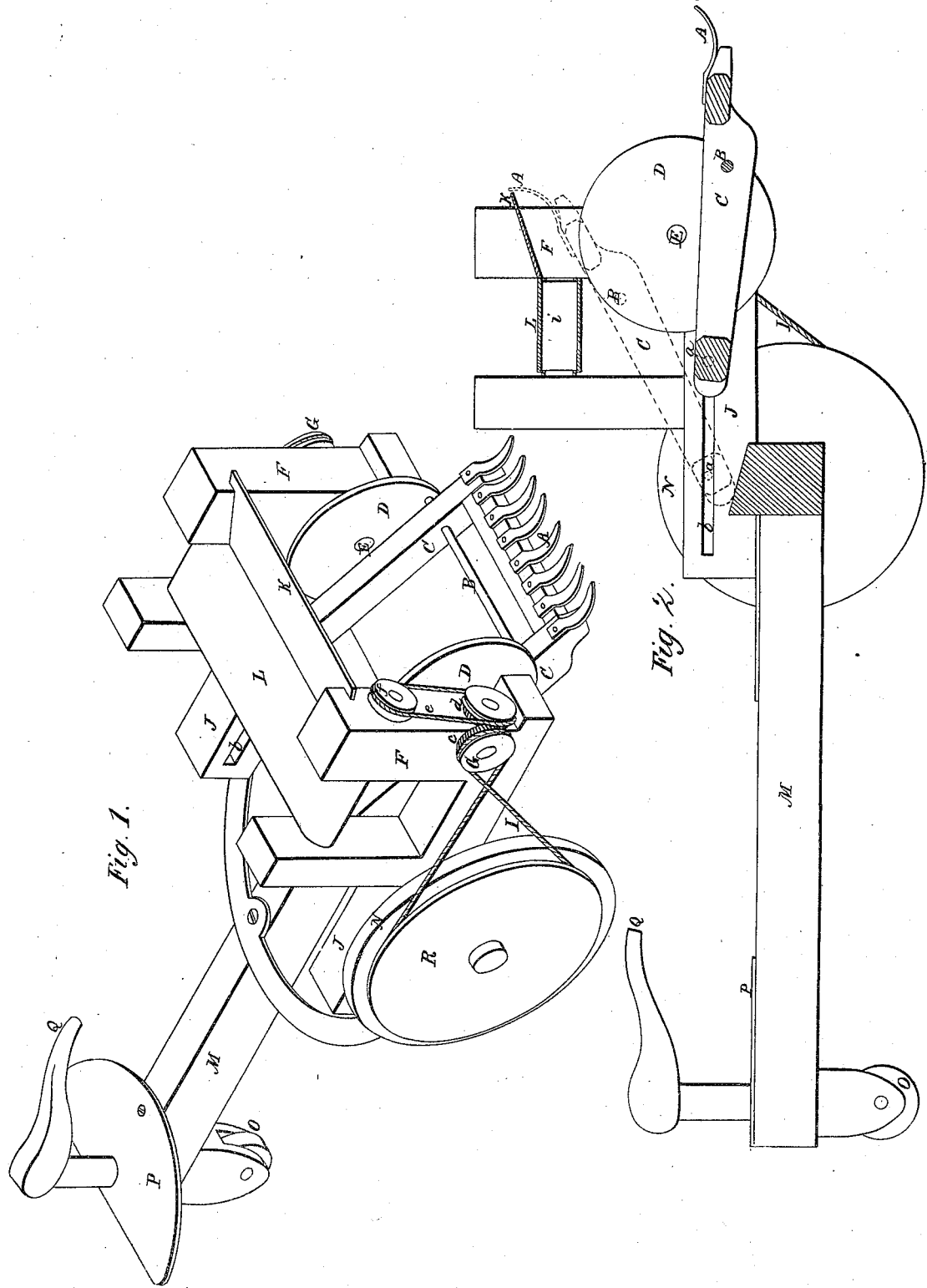

ANDREW SPRAGUE, OF COLDWATER, MICHIGAN.

IMPROVEMENT IN CORN-HARVESTERS.

Specification forming part of Letters Patent No. 15,533, dated August 12, 1856.

*To all whom it may concern:*

Be it known that I, ANDREW SPRAGUE, of Coldwater, in the county of Branch and State of Michigan, have invented a new and useful Improvement in Machines for Harvesting Maize and other Grains; and I do hereby declare that the following is a full, clear, and exact description of the construction and operation of the same, reference being had to the annexed drawings, making a part of this specification.

The nature of my invention consists in a set of metallic knives curved sufficiently to hold the gathered grain from rolling off, and arranged upon the forward end of a frame in such a manner or distance apart as to allow the stalks or stems of grain to pass between them until the ears or seeds coming in contact with the knives are cut off by them and deposited into elevators by means of a guard which the knives pass close to in their descending motion. The knives describe a circle, but do not revolve, as round a shaft. This motion of the knives A is produced by means of a small shaft or rod, B, passing through the side pieces, C, of the frame, near the fore end, and attached to the outside circumference of two wheels, D, one on each side of the frame. These wheels D at the center are attached to a shaft, E, that passes through an upright piece or post, F, with a pulley, G, for a band, I, on the other end of said shaft. Said frame or sash, at the back end on each side, has pivots $a'$ attached, which pass into grooves $b$, formed in the frame-work J of the machine, causing this end of the frame or sash to move horizontally forward and back as the side wheels, D, revolve. Said guard K is thin-edged, and so placed in the frame-work of the machine as to allow the knives to pass too near it to permit the gathered grain to fall below the guard, which descends back, so that the grain readily falls into the elevators L, which revolve toward the side, emptying the grain into a spout, from which it falls into a wagon or other proper receptacle by the side of the machine. The knives A can be of any suitable width and length, and may be placed any desired distance apart.

This machine is equally adapted to the gathering of maize and various other grains and seeds, it being only necessary to alter the distance of the knives apart to adapt it to the use intended.

The machine is moved by horses attached to a tongue, M, and two wheels, N, which are before the horses. A steering-wheel, O, is behind the horses, at the end of the tongue, where there is a platform, P, for the driver, who drives the horses and guides the machine by means of a rudder, Q. The shafts to which the wheels and pulleys are attached are turned by bands I, passing from the pulleys to another pulley, R, placed upon the outside of each drive-wheel N. The bands are crossed to give an opposite motion to the shafts to that of the drive-wheels. The elevators are kept in motion by two bevel cog-wheels, $c\ d$, one attached to the shafts and the other to the frame-work of the machine, and also a band, $e$, which passes from the last-named wheel to a pulley, $f$, which turns the shaft $i$, which the elevators turn upon.

Having set forth the nature and principles of my invention and the use to which it is adapted, I wish it to be understood that I do not claim the tongue-steering wheel or the drive-wheels and elevators; but What I do claim as my invention, and desire to secure by Letters Patent, is—

The guard K, in combination with the knives A, operated in the manner and for the purpose set forth.

ANDREW SPRAGUE.

Witnesses:
ISAAC SPRAGUE,
MARTIN P. OLDS.